US011656602B2

(12) United States Patent
Mirzendehdel et al.

(10) Patent No.: US 11,656,602 B2
(45) Date of Patent: May 23, 2023

(54) PHYSICS-AWARE AUTOMATIC SPATIAL PLANNING FOR SUBTRACTIVE AND HYBRID MANUFACTURING

(71) Applicant: PALO ALTO RESEARCH CENTER INCORPORATED, Palo Alto, CA (US)

(72) Inventors: Amirmassoud Mirzendehdel, Millbrae, CA (US); Morad Behandish, San Mateo, CA (US); Saigopal Nelaturi, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 17/445,639

(22) Filed: Aug. 23, 2021

(65) Prior Publication Data

US 2023/0071648 A1 Mar. 9, 2023

(51) Int. Cl.
*G05B 19/4099* (2006.01)

(52) U.S. Cl.
CPC ............. *G05B 19/4099* (2013.01); *G05B 2219/31053* (2013.01); *G05B 2219/49023* (2013.01)

(58) Field of Classification Search
None
See application file for complete search history.

(56) References Cited

U.S. PATENT DOCUMENTS

| 2005/0154481 | A1* | 7/2005 | Berger | ................ B33Y 50/00 700/98 |
| 2014/0005819 | A1* | 1/2014 | Garaas | ............. G05B 19/4061 700/122 |
| 2018/0079149 | A1* | 3/2018 | Suresh | ................. B29C 64/386 |
| 2018/0239334 | A1* | 8/2018 | Tramel, Jr. | ............ G01B 21/04 |
| 2018/0345647 | A1* | 12/2018 | Morris | .................... G06F 30/23 |

(Continued)

FOREIGN PATENT DOCUMENTS

WO 2021/055803 A1 3/2021

OTHER PUBLICATIONS

Mirzendehdel et al., "Topology Optimization with Accessibility Constraint for Multi-Axis Machining," preprint submitted to Computer-Aided Design Feb. 19, 2020, 19 pages (arXiv:2002.07627v1 [cs.CE] Feb. 16, 2020.).

(Continued)

*Primary Examiner* — Jason Lin
(74) *Attorney, Agent, or Firm* — MH2 Technology Law Group LLP

(57) ABSTRACT

A method includes receiving a representation of a near-net shape including a 3D part and a support volume. The method also includes calculating a measure of inaccessibility of the support volume by at least one subtractive tool assembly. The method also includes calculating a measure of change in a physical quantity of interest with respect to a change in the near-net shape. The method also includes constructing a physics-aware inaccessibility measure based at least partially upon the measure of inaccessibility, the measure of change, or both. The method also includes creating a plan to remove at least a portion of the support volume using the at least one subtractive tool assembly based at least partially upon the physics-aware inaccessibility measure.

18 Claims, 16 Drawing Sheets

(56) References Cited

U.S. PATENT DOCUMENTS

| | | | |
|---|---|---|---|
| 2019/0204807 A1* | 7/2019 | Nelaturi | B33Y 50/00 |
| 2019/0204813 A1* | 7/2019 | Behandish | G06F 30/17 |
| 2020/0171568 A1* | 6/2020 | Giller | B22F 10/47 |
| 2020/0265122 A1 | 8/2020 | Razzell et al. | |

OTHER PUBLICATIONS

Mirzendehdel et al., "Exploring Feasible Design Spaces for Heterogeneous Constraints," preprint submitted to Computer-Aided Design Jul. 9, 2019, 28 pages.

Hamilton, "Walking the tightrope between additive and subtractive manufacturing," Metal AM, vol. 2, No. 1, Spring 2016, 43 pages.

Sucan et al., "The Open Motion Planning Library," IEEE Robotics & Automation Magazine, Dec. 2012, uploaded on Jun. 2, 2014, 11 pages.

Kopp, Klaus, Extended European Search Report dated Jan. 18, 2023 in related European Application No. 22189017.1, 9 pages.

Kopp, Klaus, Extended European Search Report dated Jan. 19, 2023 in corresponding European Application No. 22188995.9, 7 pages.

* cited by examiner

PHYSICS-AWARE AUTOMATIC SPATIAL PLANNING FOR SUBTRACTIVE AND HYBRID MANUFACTURING

TECHNICAL FIELD

The present teachings relate generally to three-dimensional (3D) printing and, more particularly, to automated design generation for additive manufacturing with an accessible support volume.

Background

Additive manufacturing (AM) technologies are capable of fabricating geometrically complex parts by adding material layer-by-layer. The growing interest in AM, specifically metal AM, stems from its ability to leverage geometric complexity to design high-performance, light-weight designs for applications such as aerospace, automotive, medical, etc. However, in most metal AM technologies, such as powder-bed fusion, a sacrificial support volume is used in "overhanging" regions to dissipate excessive heat and ensure successful build of a near-net shape. As used herein, "near-net shape" (NNS) refers to the combination of the desired 3D part and the support volume, both of which are generated by the 3D printer during the AM process.

After printing, the support volume is removed using subtractive manufacturing (SM) such as milling or machining. Thus, the support volume needs to be accessible by the available machining tools and fixtures for removal. SM techniques, such as multi-axis machining, have been widely used for manufacturing high-quality reproducible parts across multiple industries (e.g., aerospace and automotive industries). In SM, a user begins with a raw stock of material (e.g., the NNS), and portions thereof (e.g., the support volume) are carved away until the desired 3D part emerges.

Therefore, what is needed is an improved system and method for design generation for additive manufacturing with an accessible support volume.

Summary

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method is disclosed. The method includes receiving a representation of an initial design domain. The method also includes iteratively generating intermediate part designs by redistributing material within the initial design domain. The intermediate part designs each include a 3D part and a support volume. The method also includes calculating a measure of inaccessibility of the support volume of each intermediate part design by at least one subtractive tool assembly. At least one of the intermediate part designs is generated based at least partially upon the measure of inaccessibility of a previous one of the intermediate part designs.

A method for generating a design of a 3D part is also disclosed. The method includes providing a computer with a representation of an initial design domain, a build orientation for building the initial design domain using an additive manufacturing process, and at least one subtractive tool assembly with a number of degrees of freedom for a subtractive manufacturing process. The method also includes iteratively generating intermediate part designs by redistributing material within the initial design domain using the computer. The intermediate part designs each include the 3D part and a support volume. The method also includes calculating a measure of inaccessibility of the support volume of each intermediate part design by the at least one subtractive tool assembly using the computer. A subsequent one of the intermediate part designs is generated based at least partially upon the measure of inaccessibility of a previous one of the intermediate part designs.

A method for generating a design of a 3D part that is to be manufactured by an additive manufacturing process followed by a subtractive manufacturing process is also disclosed. The method includes providing a computer with a representation of an initial design domain, a build orientation for building the initial design domain using the additive manufacturing process, and at least one subtractive tool assembly with a number of degrees of freedom for the subtractive manufacturing process. The method also includes generating an intermediate part design within the initial design domain using the computer. The intermediate part design includes the 3D part and a support volume. The method also includes calculating a measure of inaccessibility of the support volume of the intermediate part design by the at least one subtractive tool assembly using the computer. The method also includes generating a subsequent intermediate part design by redistributing material within the initial design domain using the computer. The subsequent intermediate part design is generated based at least partially upon the measure of inaccessibility.

A method is also disclosed. The method includes receiving a representation of a near-net shape including a 3D part and a support volume. The method also includes calculating a measure of inaccessibility of the support volume by at least one subtractive tool assembly. The method also includes calculating a measure of change in a physical quantity of interest with respect to a change in the near-net shape. The method also includes constructing a physics-aware inaccessibility measure based at least partially upon the measure of inaccessibility, the measure of change, or both. The method also includes creating a plan to remove at least a portion of the support volume using the at least one subtractive tool assembly based at least partially upon the physics-aware inaccessibility measure.

A method of planning for removal of a support volume in hybrid manufacturing is also disclosed. The method includes providing a computer with a representation of a 3D part, a near-net shape including the 3D part and the support volume, and at least one subtractive tool assembly with a number of degrees of freedom. The method also includes calculating a measure of inaccessibility of the support volume by the at least one subtractive tool assembly using the computer. The method also includes calculating a measure of change in a physical quantity of interest with respect to a change in the near-net shape using the computer. The method also includes constructing a physics-aware inaccessibility measure by combining the measure of inaccessibility and the measure of change using the computer. The physics-aware inaccessibility measure indicates a removability of a region of the support volume from the near-net shape. The method also includes creating a plan to remove the region of the support volume with the at least one subtractive tool assembly using the computer. The plan is based at least partially upon the physics-aware inaccessibility measure.

A method of planning for removal of a support volume in hybrid manufacturing where the support volume is added during an additive manufacturing process and subsequently removed through a subtractive manufacturing process is also disclosed. The method includes providing a computer with a representation of a 3D part, a near-net shape including the 3D part and the support volume, and at least one subtractive tool assembly with a number of degrees of freedom. The method also includes calculating a measure of inaccessibility of the support volume by the at least one subtractive tool assembly using the computer. The method also includes calculating a measure of change in a physical quantity of interest with respect to a hypothetical change in the near-net shape. The hypothetical change is less than a predetermined size. The method also includes constructing a physics-aware inaccessibility measure by combining the measure of inaccessibility and the measure of change using the computer. The physics-aware inaccessibility measure indicates a removability of a region of the support volume from the near-net shape. The method also includes creating a plan to remove the region of the support volume with the at least one subtractive tool assembly using the computer. The plan is based at least partially upon the physics-aware inaccessibility measure.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
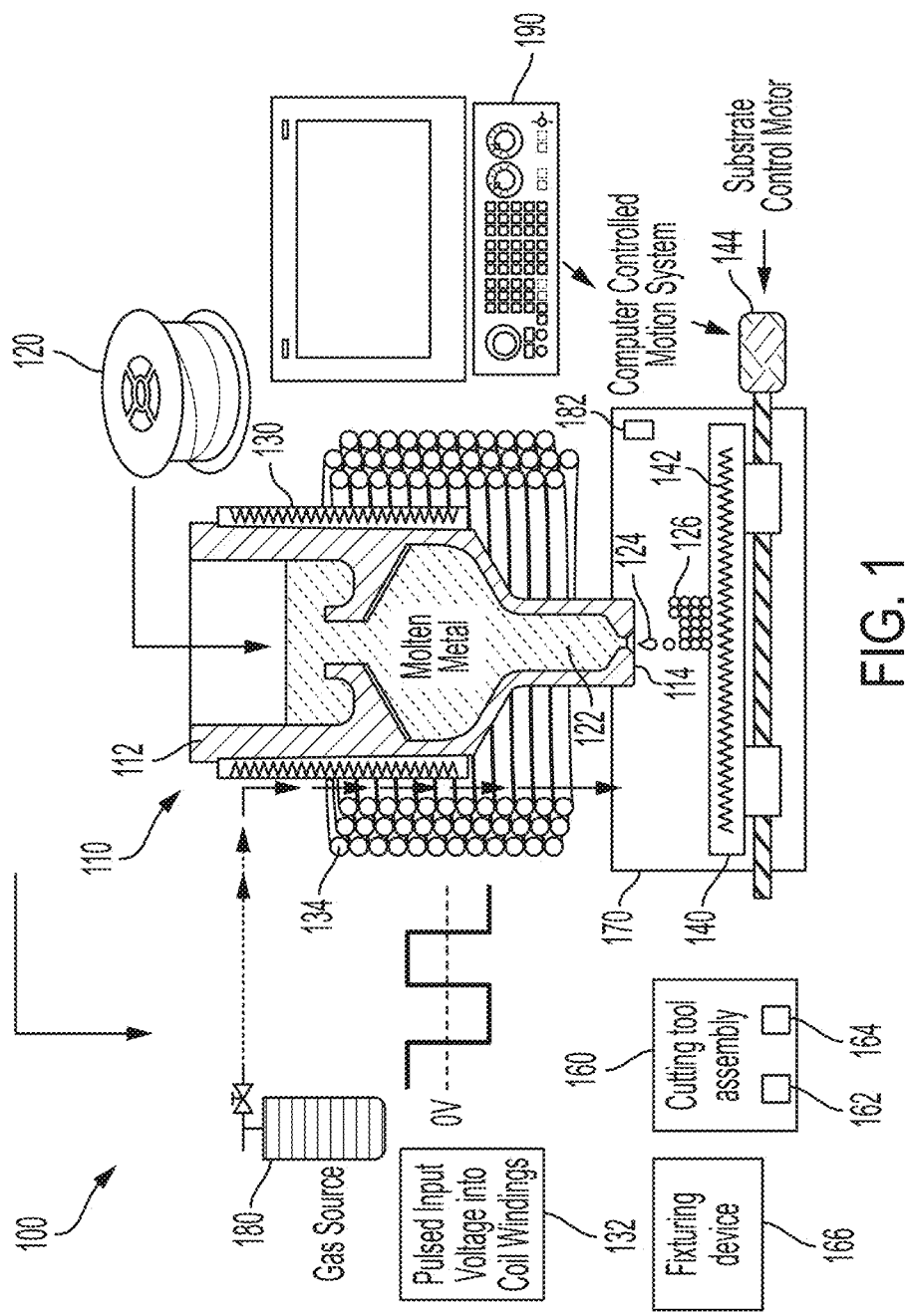
FIG. 1 depicts a cross-sectional view of a 3D printing system, according to an embodiment.

FIG. 1 depicts a schematic cross-sectional view of a 3D printing system 100, according to an embodiment. The 3D printing system 100 may include an ejector (also referred to as a pump chamber) 110. The ejector 110 may define an inner volume that is configured to receive a printing material 120. The printing material 120 may be or include a metal, a polymer, or the like. For example, the printing material 120 may be or include aluminum (e.g., a spool of aluminum wire). In another embodiment, the printing material 120 may be or include copper.

The 3D printing system 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printing system 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorentz force. The Lorentz force creates a pressure at an inlet of a nozzle 114 of the ejector 110. The pressure causes the liquid metal 122 to be jetted through the nozzle 114 in the form of one or more drops 124.

The 3D printing system 100 may also include a substrate (also referred to as a build plate) 140 that is positioned below the nozzle 114. The drops 124 that are jetted through the nozzle 114 may land on the substrate 140 and cool and solidify to produce a near-net shape (NNS) 126, which may also be referred to as a 3D object. As described in greater detail below, the NNS 126 may include a desired 3D part (also referred to as the net shape) and a support volume.

The substrate 140 may include a heater 142 therein that is configured to increase the temperate of the substrate 140. The 3D printer 100 may also include a substrate control motor 144 that is configured to move the substrate 140 as the drops 124 are being jetted (i.e., during the printing process) to cause the NNS 126 to have the desired shape and size. The substrate control motor 144 may be configured to move the substrate 140 with up to six degrees of freedom (e.g., three translations and three rotations). In another embodiment, the ejector 110 and/or the nozzle 114 may be also or instead be configured to move with up to six degrees of freedom.

The 3D printing system 100 may also include one or more subtractive tool assemblies (one is shown 160). The subtractive tool assembly 160 may include one or more holders (one is shown: 162) and one or more cutters (one is shown: 164). The holder 162 may be configured to mount and/or guide the cutter 164 to regions of interest on the NNS 126. The cutter 164 may be configured to cut (e.g., mill, machine, etc.) the support volume away from the NNS 126 to yield the 3D part. The 3D printing system 100 may also include one or more fixturing devices (one is shown: 166) that hold the NNS 126 as material is added and/or removed therefrom. For example, the fixturing device 166 may be configured to hold the NNS 126, after the AM process, as material (e.g., the support volume) is/are removed therefrom by the subtractive tool assembly 160.

In one embodiment, the 3D printing system 100 may also include an enclosure 170. The enclosure 170 may be positioned at least partially around the ejector 110, the nozzle 114, the drops 124, the NNS 126, the heating elements 130, the coils 134, the substrate 140, the subtractive tool assembly 160, or a combination thereof. In one embodiment, the enclosure 170 may be hermetically sealed. In another embodiment, the enclosure 170 may not be hermetically sealed. In other words, the enclosure 170 may have one or more openings that may allow gas to flow therethrough. For example, the gas may flow out of the enclosure 170 through the openings.

In one embodiment, the 3D printing system 100 may also include one or more gas sources (one is shown: 180). The gas source 180 may be positioned outside of the enclosure 170 and configured to introduce gas into the enclosure 170. The gas source 180 may be configured to introduce a gas that flows (e.g., downward) around the ejector 110, the nozzle 114, the heating elements 130, or a combination thereof. The gas may flow around and/or within the coils 134. The gas may flow into the enclosure 170 and/or proximate to (e.g., around) the drops 124, the NNS 126, and/or the substrate 140.

The 3D printing system 100 may also include a gas sensor 182. The gas sensor 182 may be positioned within the enclosure 170. The gas sensor 182 may also or instead be positioned proximate to the drops 124, the NNS 126, and/or the substrate 140 (e.g., in an embodiment where the enclosure 170 is omitted). The gas sensor 182 may be configured to measure a concentration of the gas, oxygen, or a combination thereof.

The 3D printing system 100 may also include a computing system 190. The computing system 190 may be configured to control the introduction of the printing material 120 into the ejector 110, the heating elements 130, the power source 132, the substrate control motor 144, the subtractive tool assembly 160, the fixturing device 166, the gas source 180, the gas sensor 182, or a combination thereof. For example, the computing system 190 may be configured to automate generation of a design (e.g., of the NNS 126) such that the design, when subsequently manufactured via AM, contains an accessible support volume that may be removed via SM to yield the 3D part.

Automated Design Generation for Additive Manufacturing with an Accessible Support Volume The systems and methods described herein may provide automated design generation for additive manufacturing with an accessible support volume. This provides a systematic approach to automated design generation while also providing removability of the support volume through subtractive manufacturing (e.g., milling) in terms of accessibility of one or more points of the support volume given the substrate 140, the subtractive tool assemblies 160, and/or the fixturing devices 166 without imposing artificial constraints on geometric complexity of the 3D part, the support geometry, the subtractive tool assemblies 160, the fixturing devices 166, or a combination thereof. This also provides efficient and effective design space exploration by providing complex designs for which its NNS 126 (e.g., 3D part+ support volume) can be fabricated using additive manufacturing and post-processed using subtractive manufacturing.

Different automated design techniques (e.g., topology optimization, machine learning, cellular automata, etc.) may consider the physical performance of a 3D part to provide organic shapes. The present disclosure solves the following optimization problem:

$$\underset{\Omega \subseteq \Omega_0}{\text{Minimize}}\ \varphi(\Omega), \tag{1a}$$

such that $$[K_\Omega][u_\Omega]=[f], \tag{1b}$$

$$V_\Omega \leq V_{target}, \tag{1c}$$

$$\tag{1d}$$

Where $\varphi(\Omega) \in \mathbb{R}$ is the value of an objective function for a given design $\Omega \subseteq \Omega_0$. The variables $[f]$, $[u_\Omega]$, and $[K_\Omega]$ represent discretized external force, a displacement vector, and a stiffness matrix, respectively, for finite element analysis (FEA). The variable $V_\Omega := \text{vol}[\Omega]$ represents the design volume, and $V_{target} > 0$ is the volume budget.

The present disclosure may provide a physics-based performance analysis by invoking physics solvers such as finite element analysis (FEA) to evaluate objectives and constraints. The present disclosure may also determine optimization decision variables such as gradients, sensitivity fields, etc. based at least partially upon the objectives and/or constraints. The present disclosure may also design manufacturing constraints (e.g., by augmenting/filtering decision variables based at least partially upon design and manufacturing considerations). The present disclosure may also update design variables based at least partially upon decision variables, and then generate an optimized design of the NSS 126 and/or 3D part.

The accessibility constraint may be augmented to the sensitivity field to allow the 3D part to be manufactured using SM. However, the automated design of AM parts with respect to accessibility of the support volume has not yet been explored.

Inaccessibility Access

The 3D printing system 100 (e.g., the nozzle 114, the substrate 140, the subtractive tool assembly 160, or a combination thereof) can operate with up to six degrees of freedom (e.g., three translations and three rotations) available for a rigid body. For example, T=(H∪K), where T represents the subtractive tool assembly 160 for multi-axis machining, H represents the holder 162, and K represents the cutter 164. Mathematically, the configuration space (C-space) of rigid motions is represented as C=$\mathbb{R}^3 \times$SO(3) where C represents the configuration space, $\mathbb{R}^3$ represents the Euclidian space, and SO(3) refers to the group of 3×3 orthogonal transformations that represent spatial rotations.

An inaccessibility measure field (IMF) may be defined over the 3D design domain $f_{IMF}: \mathbb{R}^3 \to \mathbb{R}$ for each given tool assembly T as the pointwise minimum of shifted convolutions for different choices of sharp points and available orientations $\Theta_T \subseteq SO(3)$. The IMF is described by the following equation:

$$f_{IMF}(x; O, N, T, K) := \min_{R \in \Theta_T} \min_{k \in K} vol[O \cap (R, x)(T - k)] \quad (2)$$

where $R \in \Theta$ is a rotation matrix corresponding to an available tool orientation, and point $x \in \mathbb{R}^3$ with $N = \Omega \cup S$ denoting the near-net shape fabricated of the workpiece and its corresponding support structures S. There are two independent transformations in effect. First, the shift $T \rightarrow (T - k)$ in Equation 2 may sample different ways to register the translation space with the design domain, by changing the local coordinate system to bring different sharp points to the origin. Second, the rotation $(T-k) \rightarrow (RT-Rk)$ followed by translation $(RT-Rk) \rightarrow (RT-Rk)+x$ may bring the candidate sharp point (new origin) to the query point $x \in \Omega_0$.

The same effect can be obtained by querying the convolution at $t=(x-Rk)$ so that the rigid transformation (R, t) brings the sharp point in contact with the query point: (R, t)k=Rk+t =Rk+(x-Rk)=x, as expected. The IMF may thus be computed as follows:

$$f_{IMF}(x; O, N, T, K) = \min_{R \in \Theta_T} \min_{k \in K} (1_O * \bar{1}_{RT})(x - Rk). \quad (3)$$

Equation 2 can be further extended to consider multiple subtractive tool assemblies 160. Given $n_T \geq 1$, available subtractive tool assemblies 160, $T_i=(H_i \cup K_i)$ for $1 \leq i \leq n_T$, their combined IMF may be determined by applying another minimum operation over different subtractive tool assemblies to identify the subtractive tool assemblies with the smallest volumetric interference at available orientations and sharp points:

$$f_{IMF}(x; N, O) := \min_{1 \leq i \leq n_T} f_{IMF}(x; N, O, T_i, K_i) \quad (4)$$

in which $f_{IMF}(x;N,O,T_i,K_i)$ may be determined using Equation 3.

There may be challenges in optimizing the build orientation based at least partially upon the accessibility of the support volume. As used herein, the term "build orientation" (also referred to as "build angle") refers to a direction at which the NNS 126 is additively printed layer-by-layer. First, minimizing the volume of the support volume may not be the same as minimizing the volume of inaccessible support volume (i.e., the inaccessible support volume can decrease at a higher overall support volume). Second, a large number of build orientations can become time and computationally intensive. Third, there are numerous types of support geometries (e.g., beams or tree-like structures) and overhang angles (e.g., 45° or 90°) depending on the AM process. Fourth, the shapes of the subtractive tool assembly 160 may not be ignored. Hence, it may be difficult to assign a correspondence between the translations $t \in \mathbb{R}^3$ and the points $x \in \mathbb{R}^3$ within the near-net shape 126 unless one or more (e.g., all) possible contact configurations are analyzed, and the boundary points are treated differently from the interior points. Fifth, the shapes of the substrate 140, the subtractive tool assembly 160, and the fixture 166 may not be ignored. Sixth, the analysis may be highly non-linear, meaning a small change in $x \in N$ can dramatically change the accessibility in a far-away point $y \in \mathbb{R}^3$.

Figure 2:
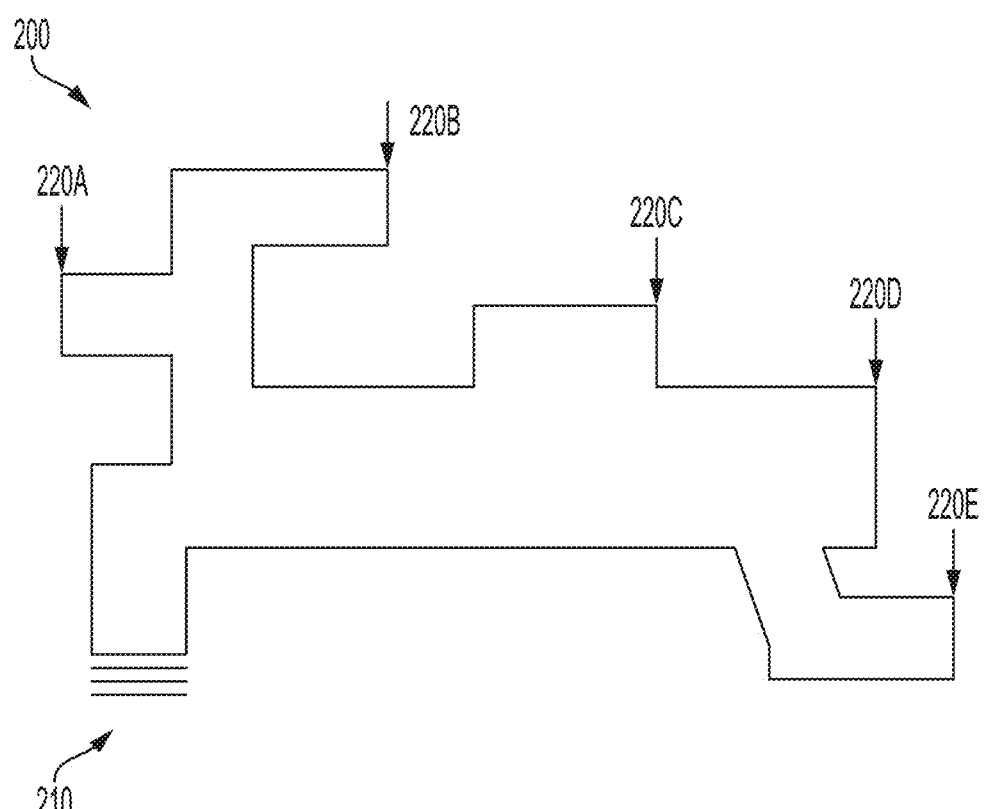
FIG. 2 depicts a side view of an initial design and boundary condition, according to an embodiment.

FIG. 2 depicts a schematic side view of an initial design and boundary condition 200, according to an embodiment. The "initial design" and/or the "initial design domain" refers to an envelope within which the optimized design lies. The "boundary condition" refers to one or more physical forces and restraints applied to the design. As shown in FIG. 2, the initial design and boundary condition 200 may have one or more fixed points (one is shown: 210). The fixed point 210 may secure the initial design and boundary condition 200 in a predetermined build orientation (e.g., 0°) during the AM process. The initial design and boundary condition 200 may also experience one or more forces (five are shown: 220A-220E). The forces may be vertical (e.g., downward) forces.

Figure 3:
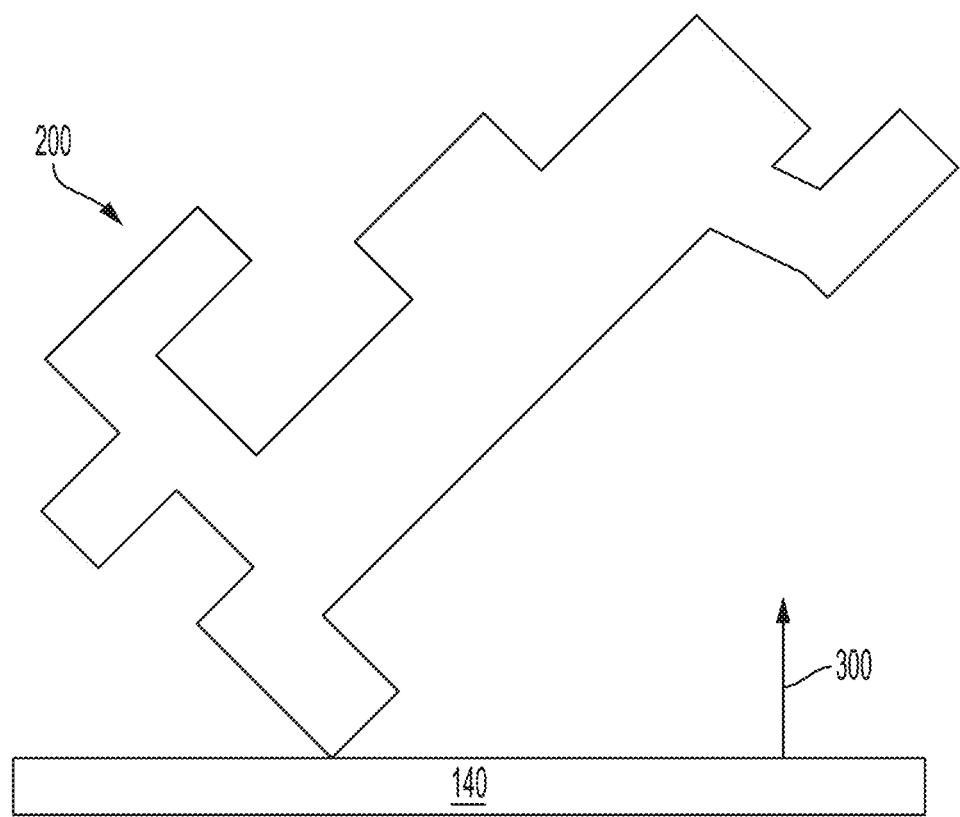
FIG. 3 depicts a side view of the initial design and boundary condition in a different build orientation (e.g., 45°), according to an embodiment.

FIG. 3 depicts a schematic side view of the initial design and boundary condition 200 in a different build orientation (e.g.,45°), according to an embodiment. The build direction 300 is vertical (e.g., upward) from the substrate 140. Referring to FIGS. 2 and 3, the present disclosure may be able to determine the stiffest design at $V_{target}=0.5$. The build direction 300 and substrate 140 may be as shown in FIG. 3.

Figures 4, 5:
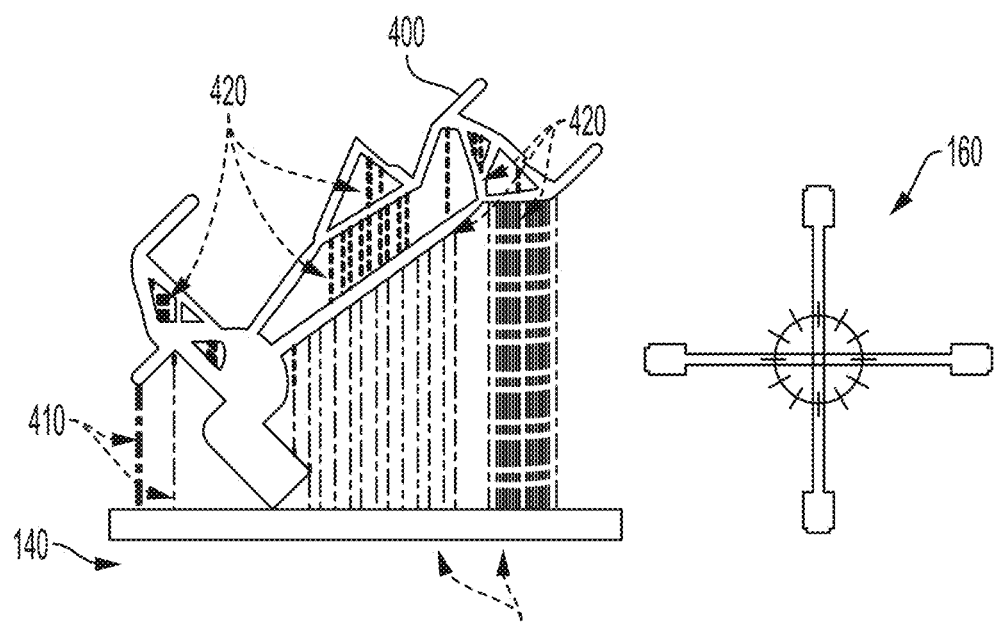
FIG. 4 depicts a side view of a near-net shape (NNS) including a 3D part and a support volume, according to an embodiment.
FIG. 5 depicts a schematic view of a subtractive tool assembly for removing the support volume from the NNS to yield the 3D part, according to an embodiment.

FIG. 4 depicts a schematic side view of the NNS 126, according to an embodiment. FIG. 5 depicts a schematic view of the subtractive tool assembly 160, according to an embodiment. The NNS 126 includes a 3D part 400 and a support volume (also referred to as support structures). The support volume may include a first support volume 410 and a second support volume 420. The first support volume 410 may be accessible by the subtractive tool assembly 160, and thus may be removed. The second support volume 420 may be inaccessible by the subtractive tool assembly 160, and thus may not be removed. The design in FIG. 4 is at a 0.5 volume fraction without considering support volume accessibility.

FIGS. 4 and 5 illustrate a predetermined (e.g., optimized) design $\Omega$ of the NSS 126 and/or 3D part 400, the accessible support volume 410, the inaccessible support volume 420, and the subtractive tool assembly 160. The set of approach directions are $\Theta=0°$, 30°, 60°, 90°, 120°, 150°, 180°, 210°, 240°, 270°, 300°, and 330°. A fraction of the support volume may be inaccessible, and thus cannot be removed from the NNS 126. As a result, the 3D part 400 may not be manufacturable.

Figure 6:
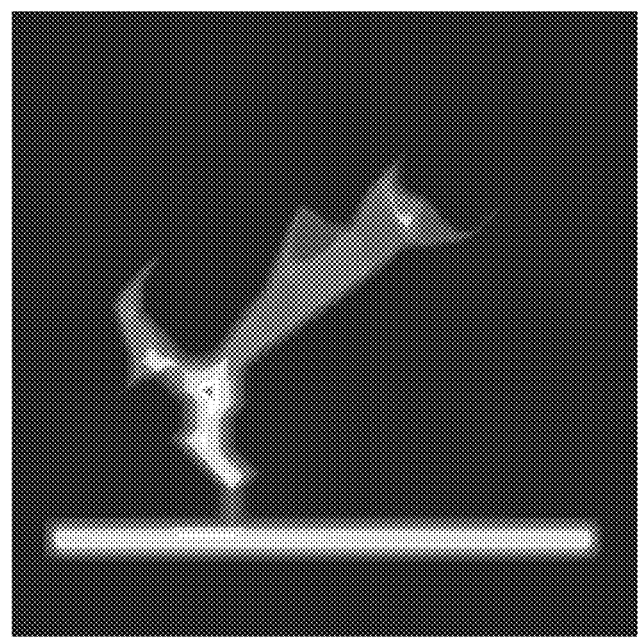
FIG. 6 depicts an image of an IMF over the NNS in FIG. 4, according to an embodiment.
Figure 7:
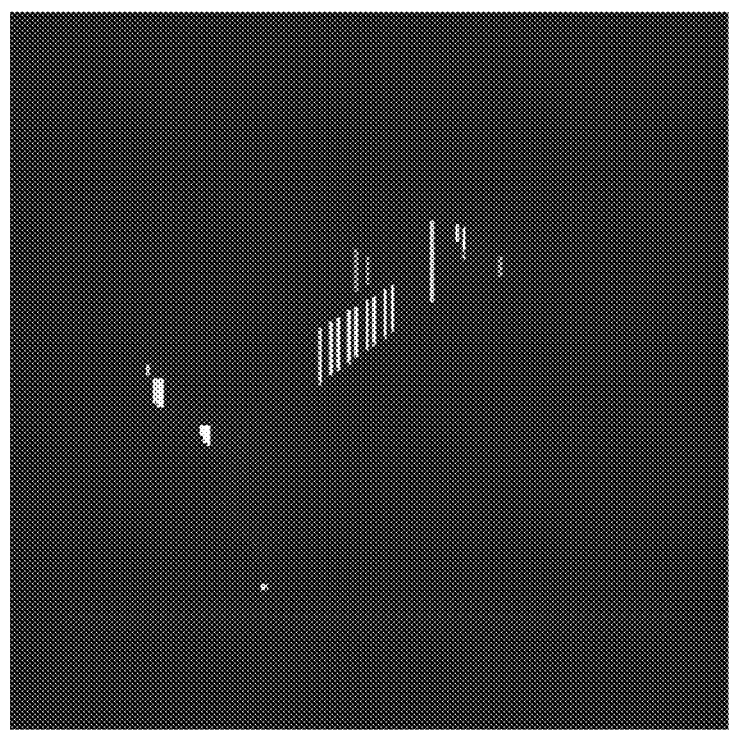
FIG. 7 depicts an image of the IMF over the inaccessible support volume in FIG. 4, according to an embodiment.

FIG. 6 depicts an image of the IMF over the NNS 126 in FIG. 4, and FIG. 7 depicts an image of the IMF over the inaccessible support volume 420 in FIG. 4, according to an embodiment. The IMF images may be generated without considering the accessibility of the support volume 410, 420.

Accessibility Constraint on Support Volume Based on IMF

The system and method disclosed herein may automatically generate the design of the NNS 126 such that the resulting shape of the NNS 126 and/or 3D part 400 may be manufacturable using AM and then SM. The present disclosure may use a physics-based performance analysis that invokes physics solvers (e.g., FEA) to evaluate objectives and constraints. The present disclosure may also determine decision variables (e.g., gradients, sensitivity fields, etc.) based at least partially upon objectives and/or constraints. The present disclosure may also perform an accessibility analysis by constructing the configuration space (C-space) of the 3D part 400 and subtractive tool assembly 160, sampling the tool rotations in C-space, and constructing the IMF field(s). The present disclosure may also enrich decision variables with accessibility information by filtering/augmenting the decision variables with/by the IMF field(s)

such that only the accessible parts are subject to modification. The present disclosure may also update design variables based on the modified decision variables. A SM design may then be generated.

These activities may be based at least partially upon geometric, topological, material, and/or physical aspects of the available manufacturing capabilities. These activities may not be performed in isolation. For example, density-based TO may involve a continuous density function $\rho_\Omega:\Omega\to[0,1]$ to represent intermediate designs, rather than indicator functions. A threshold $0<\tau<1$ (e.g., $\tau=0.5$) may be used to define the indicator functions as $1_\Omega(x)=1$ iff $\rho_\Omega(x)>\tau$ for use in equation 3. However, in other embodiments, direct use of the density function may provide additional smoothing:

$$f_{IMF}(x;\rho_O, T, K) := \min_{R\in\Theta} \min_{k\in K}(\rho_O * \tilde{1}_{RT})(x - Rk). \quad (5)$$

The function $\rho_O:O\to[0,1]$ can be obtained as $\rho_O(x):=\rho_\Omega(x)+1_F(x)$, in which $\rho_\Omega(x)$ may be obtained directly from TO. The combined IMF for the tool assemblies $f_{IMF}(x;\rho_O)$ $f$IMF(x;$\rho$O) may be computed as:

$$f_{IMF}(x;\rho_O) := \min_{1\le i\le n_T} f_{IMF}(x;\rho_O, T_i, K_i) \quad (6)$$

$$\text{Minimize } \varphi(\Omega), \quad (7a)$$
$$\Omega\subseteq\Omega_0$$

such that $$[K_\Omega][u_\Omega]=[f], \quad (7b)$$

$$V_{106} \le V_{target}, \quad (7c)$$

$$V_{S_{sec}}=0, \quad (7d)$$

where $V_{S_{sec}}$ is the volume of the inaccessible support volume 420. To incorporate the accessibility constraints for multi-axis machining, the sensitivity field $S_\Omega$ may be modified as follows.

$$S_\Omega:=(1-w_{acc})\bar{S}_\varphi+w_{acc}\bar{S}_{IMF}, \quad (8)$$

where $0\le w_{acc}<1$ is the filtering weight for accessibility, and can be either a constant or adaptively updated base on the secluded volume $V_{r(o)}$. The variable $\bar{S}_\varphi$ represents the normalized sensitivity field with respect to the objective function. The volume constraint may be satisfied with the optimality criteria iteration. The variable $\bar{S}_{IMF}$ represents the normalized accessibility field defined in terms of the normalized IMF as:

$$\bar{S}_{IMF}(x) := \begin{cases} 0.01\bar{f}_{IMF}(x;\rho_O) & \text{if } x \in \Omega \cup S_{acc}, \\ \bar{f}_{IMF}(x;\rho_O) & \text{if } x \in S_{sec}, \\ 0 & \text{otherwise.} \end{cases} \quad (9)$$

Figure 8:
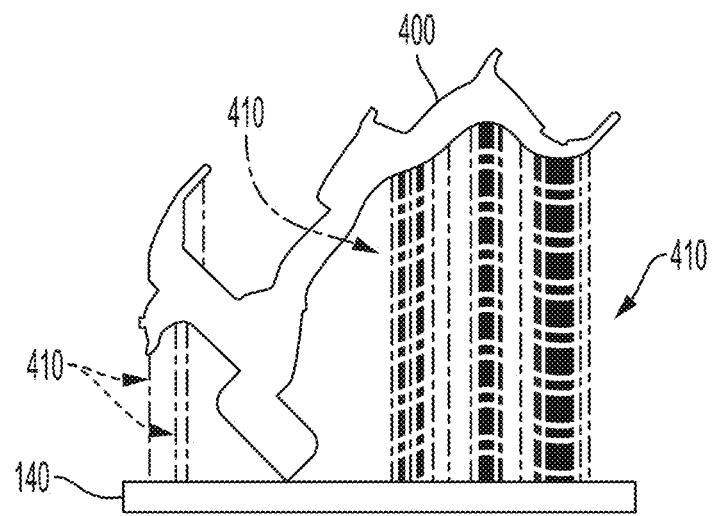
FIG. 8 depicts another side view of the NNS, according to an embodiment.
Figure 9:
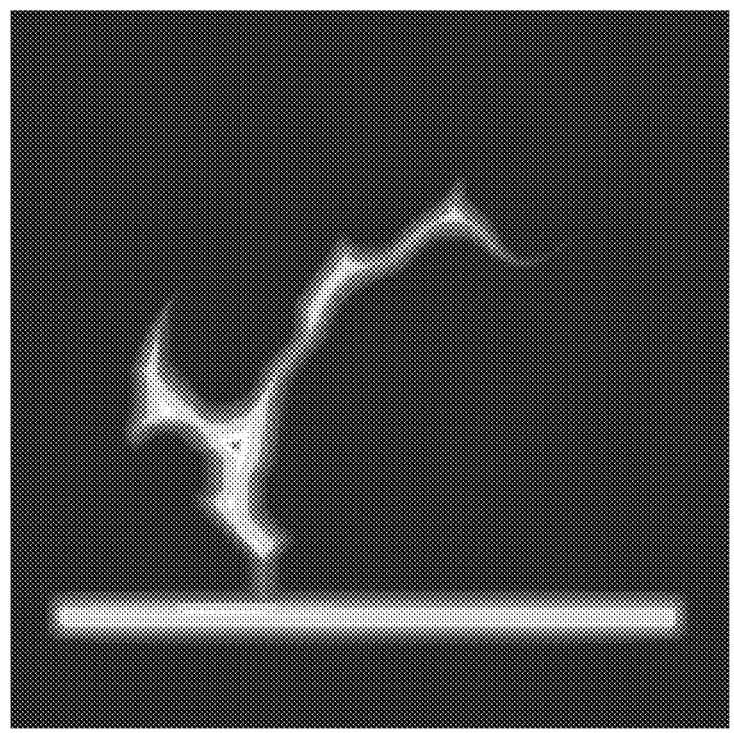
FIG. 9 depicts an image of the IMF over the NNS in FIG. 8, according to an embodiment.

FIG. 8 depicts another schematic side view of the NNS 126, according to an embodiment. The design in FIG. 8 is at a 0.5 volume fraction and considers support volume accessibility. FIG. 9 depicts an image of the IMF over the NNS 126 in FIG. 8, according to an embodiment.

Figure 10:
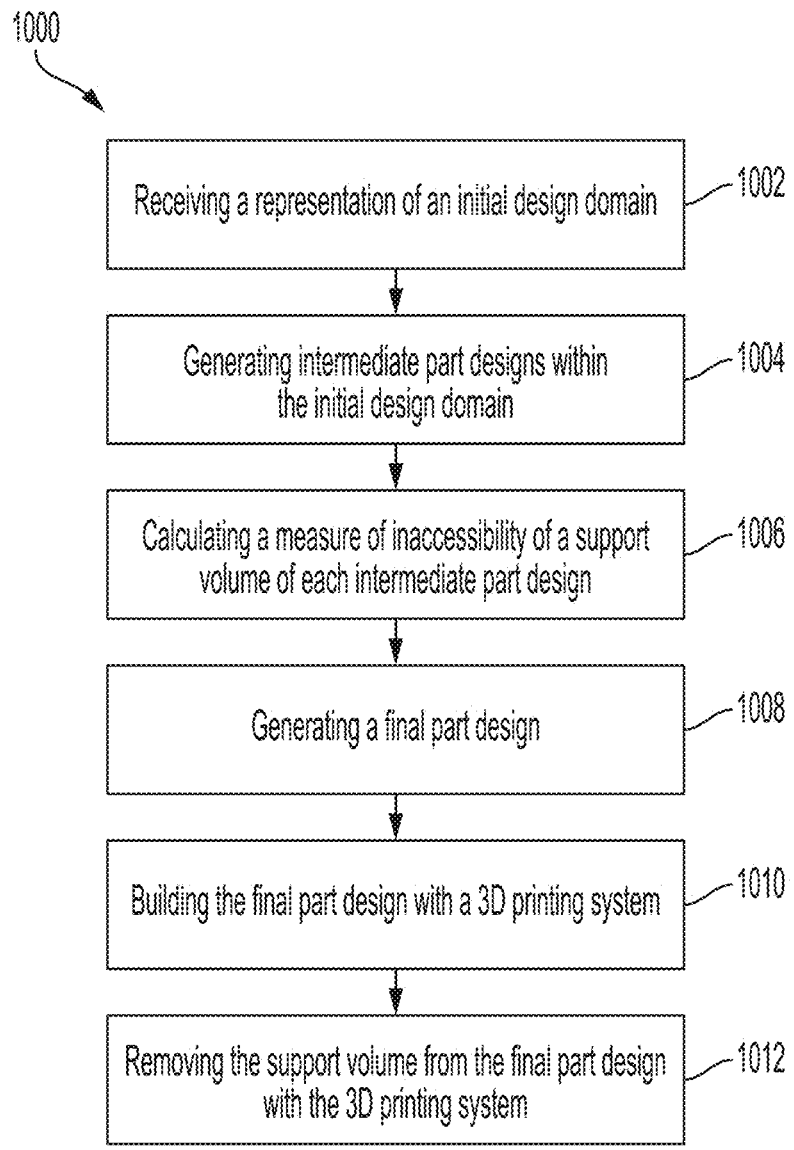
FIG. 10 depicts a flowchart of a method for generating a design of the NNS, according to an embodiment.

FIG. 10 depicts a flowchart of a method 1000 for generating a design, according to an embodiment. The design may be of the NNS 126, the 3D part 400, or both. The NNS 126 may then be manufactured via AM, and the NNS 126 may include an accessible support volume 410 that may subsequently be removed via SM to yield the 3D part 400.

An illustrative order of the method 1000 is provided below; however, one or more steps of the method 1000 may be performed in a different order, combined, split into sub-steps, repeated, or omitted without departing from the scope of the disclosure. One or more steps of the method 1000 may be performed using the computing system 190.

The method 1000 may include receiving a representation of the initial design domain 200, as at 1002. The representation may be received by (and/or provided to) the computing system 190. The representation may also or instead include a build orientation for building the initial design domain 200 using the additive manufacturing process. The representation may also or instead include the subtractive tool assembly 160.

The method 1000 may also include generating intermediate part designs within the initial design domain 200, as at 1004. The intermediate part designs may be generated by the computing system 190. An intermediate part design refers to a design of the near-net shape 126 and/or the 3D part 400 that is generated after the initial design domain 200 and before the final part design (described below). The intermediate part designs may be generated iteratively by redistributing material within the initial design domain. Each intermediate part design may include the near-net shape 126, the 3D part 400, the support volume 410, 420, or a combination thereof. In at least one embodiment, the near-net shape 126, the 3D part 400, the support volume 410, 420, or a combination thereof may vary (e.g., slightly) from one intermediate part design to the subsequent intermediate part design.

The method 1000 may also include calculating a measure of inaccessibility of the support volume 410, 420 of each intermediate part design, as at 1006. The measure of inaccessibility may be calculated by the computing system 190. The measure of inaccessibility refers to an inability of the subtractive cutting assembly 160 to access and/or remove one or more regions of the support volume 410, 420 (e.g., in the initial design domain). The measure of inaccessibility may be quantitative. For example, the measure of inaccessibility may be in terms of a volumetric amount of the support volume 410, 420 that is inaccessible, a percentage of the support volume 410, 420 that is inaccessible, a ratio of the support volume 410, 420 that is inaccessible, or the like.

As mentioned above, at least a portion of the method 1000 may be iterative. Thus, at least one (e.g., each) of the intermediate part designs may be generated based at least partially upon the measure of inaccessibility of a previous one of the intermediate part designs. This iterative process may continue until termination criteria are met. In one embodiment, the termination criteria may include the measure of inaccessibility dropping below a predetermined threshold. This may help to minimize the amount, percentage, and/or ratio of the inaccessible support volume 420 (e.g., with respect to the accessible support volume 410).

The method 1000 may also include generating a final part design, as at 1010. The final part design may be generated by the computing system 190. The final part design may be generated within the initial design domain 200. The final part design may be generated based at least partially upon the intermediate part design(s) and/or the measure(s) of inaccessibility.

The method 1000 may also include building the final part design with the 3D printing system 100, as at 1012. The method 1000 may also include removing the support volume 410, 420 from the final part design with the 3D printing system 100, as at 1014. More particularly, this may include removing the accessible support volume 410 from the final part design using the subtractive tool assembly 160. This may yield the 3D part 400.

Path Planning

In one embodiment, the system and method may invoke path planners such as open motion planning library (OMPL) to test for sufficient accessibility conditions. The new field, coupled with IMF, can be used to generate designs that satisfy both conditions of existence of a connected path.

In one embodiment, the system and method may provide an automated approach to removing the support volume 410, 420 where the IMF is computed over one or more (e.g., all) of the support volume 410, 420, and the conditions for existence of a plan is evaluated. In another embodiment, the system and method may automatically optimize a shape to meet multiple physical performance criteria while ensuring that the resulting shape has an accessible support volume 410 given the multiple subtractive tool assemblies 160, tool orientations, and build direction(s). In another embodiment, the system and method may provide an automated approach to support volume removal planning where the IMF is computed over one or more (e.g., all) of the support volume 410, 420, and the support volume 410, 420 is removed based upon a predetermined (e.g., optimized) path. For example, the accessible support volume 410 may be removed using path planners such as OMPL. In another embodiment, the system and method may automatically generate a shape to meet multiple physical performance criteria while ensuring that the resulting support volume 410, 420 is removable from the NNS 126 with the given set of subtractive tool assemblies 160, orientations, and fixturing devices 166.

Physics-Aware Automatic Spatial Planning for Subtractive and Hybrid Manufacturing As mentioned above, an additive manufacturing (AM) process may produce a near-net shape 126, defined as a shape that closely conforms to the intended design to be manufactured (e.g., the 3D part 400) along with additional support volume (also referred to as support structures and/or scaffolding) 410, 420 added during the AM process. The support volume 410, 420 may be subsequently removed so that the intended design (e.g., 3D part 400) may be fabricated from the NNS 126. The systems and methods disclosed herein may provide a spatial planning approach to automatically remove the support volume 410, 420 using the multi-axis subtractive tool assembly 160 while ensuring that 1) the work-piece (e.g., NNS 126) is held by the fixture 166 throughout the support removal process (i.e., it is not detached from the platform before some or all supports 410, 420 are removed) and 2) the part 400 is not damaged in the removal process. The multi-disciplinary approach involves solving the corresponding physics problems, augmenting additional physics-based sensitivity fields such as topological sensitivity field (TSF) to the inaccessibility measure field (IMF), and producing an efficient support removal plan.

Producing the 3D part 400 using AM may include some post-processing operations, typically in the form of machining or other subtractive manufacturing (SM) processes. AM may therefore be understood as one of many processes that may be used to manufacture a part and not a stand-alone solution. A sequence of AM and SM processes (in no particular order) is defined as a hybrid manufacturing process. Hybrid machines may couple a LENS (Laser Engineered Net Shaping) AM process with a high-axis milling center to enable AM on curved surfaces.

In a hybrid manufacturing process, the interaction between SM and AM may be analyzed, for example, when planning the layout and removal of supporting/scaffolding material 410, 420 generated by the AM process to create the NNS 126. The AM process may generate the support volume 410, 420 to sustain the manufactured part (e.g., NNS 126) so that it does not collapse under its own weight as material is added during the AM process. The resulting NNS 126 (e.g., the 3D part 400 along with the support volume 410, 420) may then be manually post-processed to remove the support volume 410, 420 and then finish the 3D part 400. It is possible that with some AM process plans, the support volume 410, 420 may be placed at locations that are inaccessible to the subtractive tool assemblies 160 used in the SM process. Furthermore, the geometry of the part 400, the support volume 410, 420, and the subtractive tool assembly 160 may create a complex space of feasible (e.g., non-colliding) tool configurations (e.g., positions and orientations) that determine support volume removability. Therefore, the problem of removing AM support volume 410, 420 in a SM process is a spatial planning problem involving the analysis of the tool's feasible configurations against a dynamic NNS 126 that is updated whenever a support volume 410, 420 is removed. The following description focuses on SM operations that remove previously generated AM support volume 410, 420.

Inaccessibility Measure Field

The accessibility analysis for imposing support volume accessibility constraints through multi-axis machining is provided below. For the subtractive tool assembly 160, $T=(H \cup K)$ can operate with up to six degrees of freedom (e.g., three translations and three rotations) available for a rigid body, where H and K represent the holder 162 and the cutter 164, respectively, $\Omega$ represents the 3D part 400, F represents the substrate 140 (and other fixtures), and S represents the support volume 410, 420.

Mathematically, the configuration space (C-space) of rigid motions may be represented as $C = \mathbb{R}^3 \times SO(3)$; $SO(3)$ refers to the group of 3×3 orthogonal transformations that represent spatial rotations. The inaccessibility measure field (IMF) may be defined over the 3D design domain $f_{IMF}$: $\mathbb{R}^3 \to \mathbb{R}$ for each given tool assembly T and orientation R $\in \Theta$, where available orientations for the tool T is $\Theta \subseteq SO\,3$, as the pointwise minimum of shifted convolutions for different choices of sharp points (which depends on T):

$$f_{IMF}(x; O, T, K, R) := \min_{k \in K} vol[O \cap (R, x)(T - k)]. \qquad (10)$$

where point $x \in O$, and obstacle $O = \Omega \cup F$. There are two independent transformations in effect. First, the shift $T \to (T-k)$ in Equation 10 may try different ways to register the translation space with the design domain, by changing the local coordinate system to bring different sharp points to the origin. Second, the rotation $(T-k) \to (RT-Rk)$ followed by translation $(RT-Rk) \to (RT-Rk)+x$ may bring the candidate sharp point (new origin) to the query point $x \in \Omega$.

The same effect can be obtained by querying the convolution at $t = (x-Rk)$ so that the rigid transformation $(R, t)$ brings the sharp point in contact with the query point: $(R, t)k = Rk+t = Rk+(x-Rk) = x$, as expected. The IMF may thus be computed as follows:

$$f_{IMF}(x; O, T, K, R) = \min_{k \in K}(1_O * \bar{1}_{RT})(x - Rk). \qquad (11)$$

Physics-Based Sensitivity Field

For a given physical quantity of interest φ, a topological sensitivity field (TSF) defined at every point x of the design Ω may be determined to measure the change in φ if an infinitesimally small amount of material is removed from that point. TSF can be defined as:

$$TSF(x;\Omega) := \lim_{\epsilon \to 0^+} \frac{\varphi(\Omega - B_\epsilon(x)) - \varphi(\Omega)}{vol[\Omega \cap B_\epsilon(x)]}, \quad (12)$$

$B_\epsilon(x) \subseteq \Omega$ is a small 3D ball of radius $\epsilon \to 0^+$ centered at a given query point $x \in \Omega$. The numerator of the limit evaluates the (e.g., presumably infinitesimal) change in φ(Ω) when the candidate design is modified as $\Omega \to (\Omega - B_\epsilon(x))$ (e.g., by puncturing an infinitesimal cavity at the query point). The denominator $vol[\Omega \cap B_{\epsilon(x)}] = O(\epsilon^3)$ as $\epsilon \to 0^+$ measures the volume of the cavity.

TSF may be used in topology optimization where the material is removed from regions with lower TSF values. However, TSF has not previously been used in the context of spatial planning.

Physics-Aware Automatic Spatial Planning

One of the challenges in automated spatial planning for subtractive and hybrid manufacturing is considering the impact of the physical forces. Examples of these forces can be the contact forces of the subtractive tool assembly 160 with the NNS 126 at removal points or gravity when the sacrificial support volume 410, 420 is connecting the 3D part 400 to the substrate 140 held by the fixture 166. Given the two fields IMF and TSF, a physics-aware IMF (PIMF) may be defined to find accessible regions with the least negative impact on the work-piece, and subsequently generate automated manufacturing plans that are feasible and practical. Mathematically, PIMF can be written as:

$$PIMF(x;\Omega) := w_1 IMF(x;\Omega) + (1-w_1) TSF(x;\Omega) \quad (13)$$

Both IMF and TSF may be normalized, and $w_1$ may be from about 0.1 to about 0.9, from about 0.2 to about 0.8, from about 0.3 to about 0.7, or from about 0.4 to about 0.6 (e.g., about 0.5).

Physics-Aware Automatic Support Removal Planning for Hybrid Manufacturing

Automatic support volume removal planning is an example of spatial manufacturing planning, where given a set of tool assemblies 160, tool orientations, and fixturing devices 166, a greedy algorithm may be constructed to remove the support volume 410, 420 while ensuring that the NNS 126 remains attached to the substrate 140 held by the fixturing device 166 until the last support volume 410, 420 is removed. In other words, a sequence of support removal may be determined by selecting the most efficient tool 160, orientation, and fixture 166 while ensuring that NNS 126 and/or 3D part 400 does not prematurely detach from the substrate 140 and fall under its weight. Subsequently, the TSF may be determined, which captures the change in the overall structural stiffness if material is (e.g., hypothetically) removed from each point in NNS 126. To find the total accessible regions $S_i^{acc}$ for each tool $T_i$, i=1, ..., $n_T$, orientation $R_{ij}$ ($j^{th}$ orientation of the $i^{th}$ tool), and fixture 166, the IMF with respect to non-sacrificial obstacle O=Ω∪F may be determined according to Equation 11. This is a condition to prevent a collision between the selected tool 160 in a particular orientation with the NNS 126 and fixturing devices 166. The accessible support volume regions for each tool 160 and orientation can be written as:

$$S_i^{acc} \subseteq S = \{\forall x \in S : f_{IMF}(x;\Omega,F,T_i,K_i,R_{ij}) \leq \tau_{acc}\}. \quad (5) \quad (14)$$

where $\tau_{acc}$ is a small threshold value given the numerical errors from discretization of models. To find the next step in removing the sacrificial support volume 410, 420, the near-net IMFs $f_{IMF}(x;\Omega,S,F,T_i,K_i,R_{ij})$ may be determined for each tool 160 and its available orientations over the NNS 126 to find removable support volume $S_i$ to ensure no collision between the tool $T_i$ under orientation $R_{ij}$ and the remaining support volume 410, 420. Subsequently, the TSF may be augmented with these near-net IMFs, and the following PIMF may be determined:

$$PIMF_{ij} := w_1 f_{IMF}(N,F,T_i,K_i,R_{ij}) + (1-w_1) f_{TSF}(N,F,T_i,K_i,R_{ij}) \quad (15)$$

Considering a maximum allowed removal volume and a threshold level-set value $\tau_{rem}$, the removable support volume for the tool $T_i$ may be determined under orientation $R_{ij}$:

$$S_{rem}^{ij} \subseteq S_{acc}^i = \{\forall x \in S : PIMF_{ij} \leq \tau_{rem}\} \quad (16)$$

Figure 11:
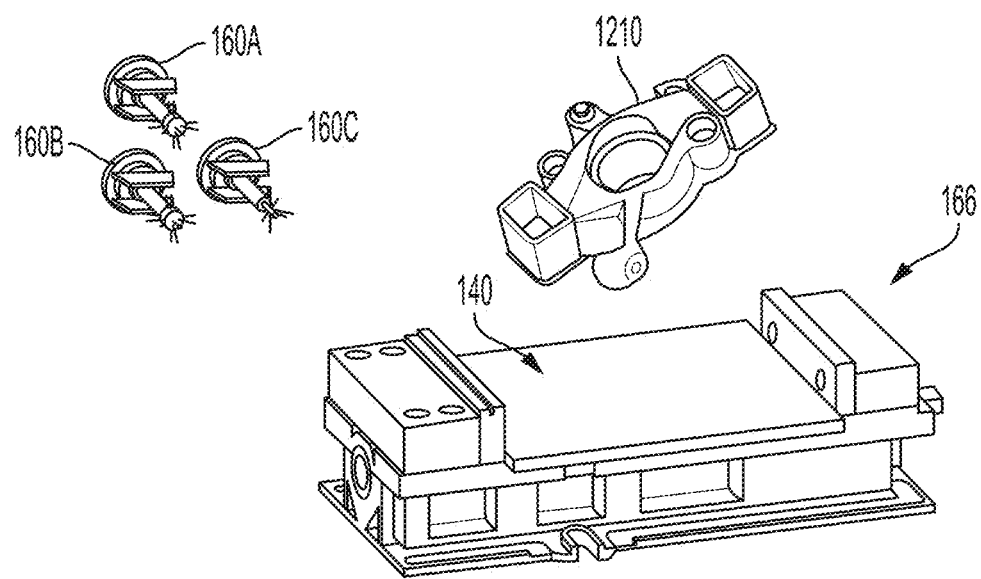
FIG. 11 depicts perspective view of a portion of the 3D printing system in FIG. 1, according to an embodiment.

FIG. 11 depicts a portion of the 3D printing system 100, according to an embodiment. More particularly, FIG. 11 shows a support volume removal setup with 3 different subtractive tool assemblies 160A-160C and a plurality of (26) different subtractive tool orientations. In this example, the first subtractive tool assembly 160A has 14 different orientations, the second subtractive tool assembly has 6 different orientations, and the third subtractive tool 160C has 6 different orientations. FIG. 11 also shows another example of the 3D part 1210, the substrate (i.e., build platform) 140, the fixturing device 166 holding the substrate 140.

Figure 12:
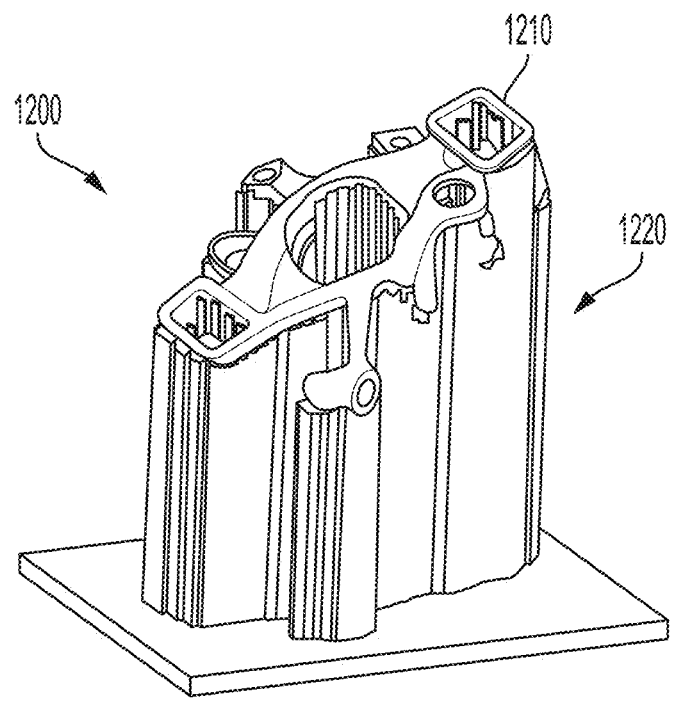
FIG. 12 depicts another example of the NNS on a build platform, according to an embodiment.

FIG. 12 depicts another example of the NNS 1200 with the substrate 140, according to an embodiment. The NSS 1200 includes the 3D part 1210 and the support volume 1220.

Figure 13A:
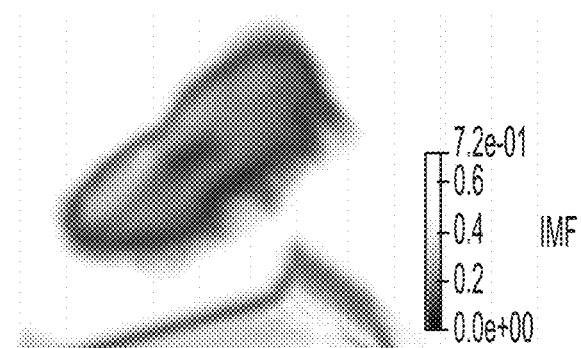
FIGS. 13A-13E depict different fields that are computed for a first subtractive tool assembly and its first orientation, according to an embodiment.
Figure 13B:
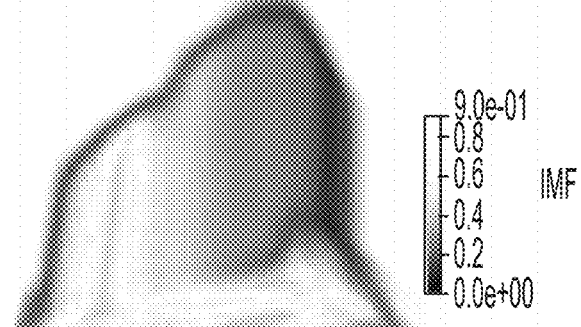
Figure 13C:
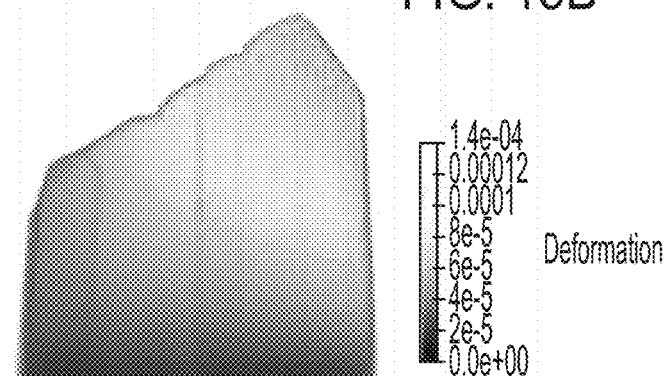
Figure 13D:
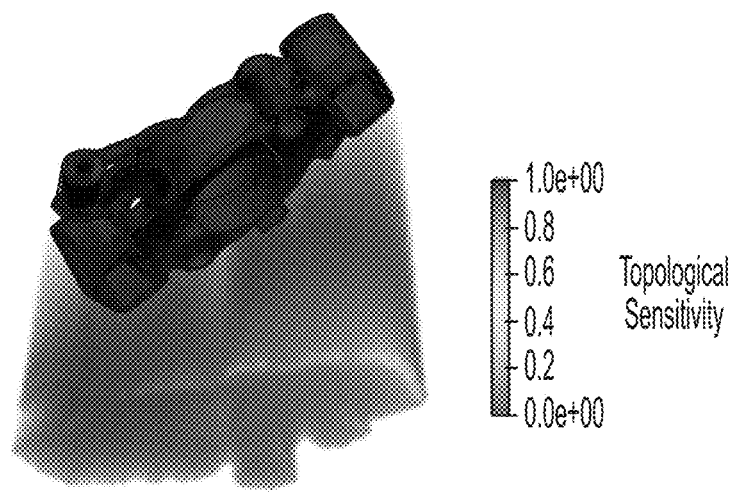
Figure 13E:
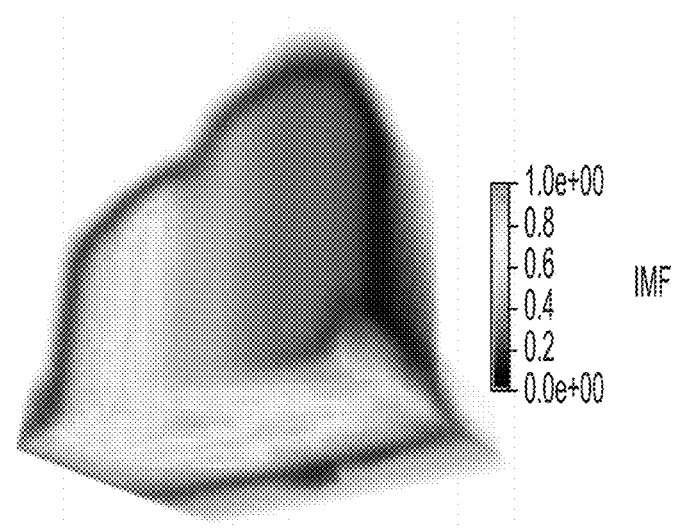

FIGS. 13A-13E depict different fields that are computed for the first subtractive tool assembly 160A ($T_1$) and its first orientation $R_{11}$, according to an embodiment. More particularly, FIG. 13A shows the IMF with obstacle O=Ω∪F for $T_1$ and $R_{11}$. FIG. 13B shows the IMF with obstacle N=N∪F. FIG. 13C shows the deformation field on the NNS 1200. FIG. 13D shows the TS field on the support volume 1220. FIG. 13E shows the physics-aware IMF for $T_1$ and $R_{11}$ ($PIMF_{11}$).

Figure 14A:
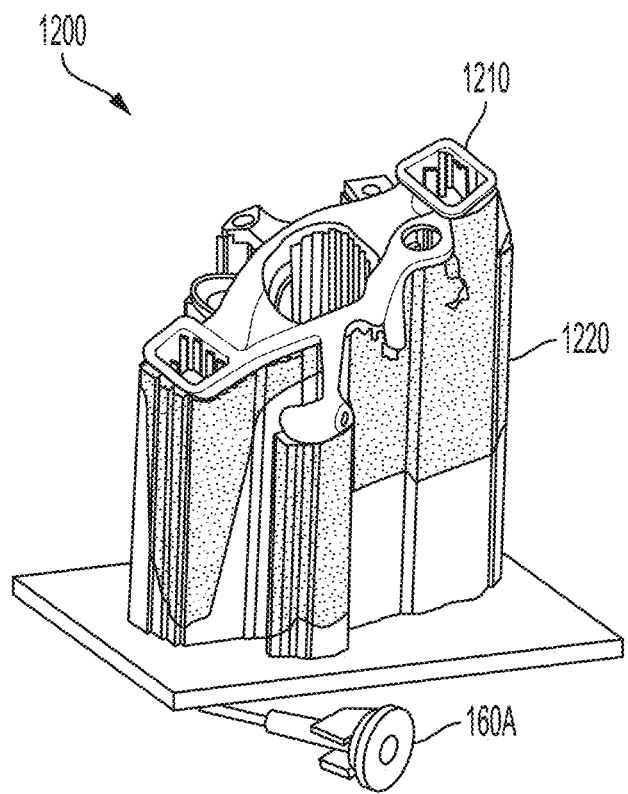
FIGS. 14A-14E depict progressive removal of the support volume from the NSS to yield the 3D part, according to an embodiment.
Figure 14B:
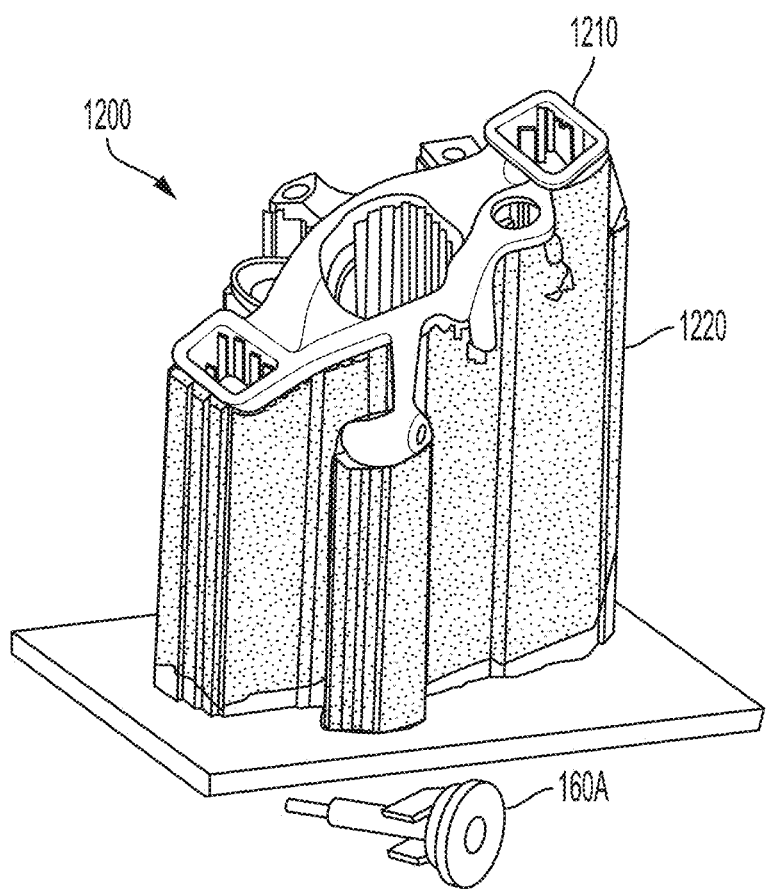
Figure 14C:
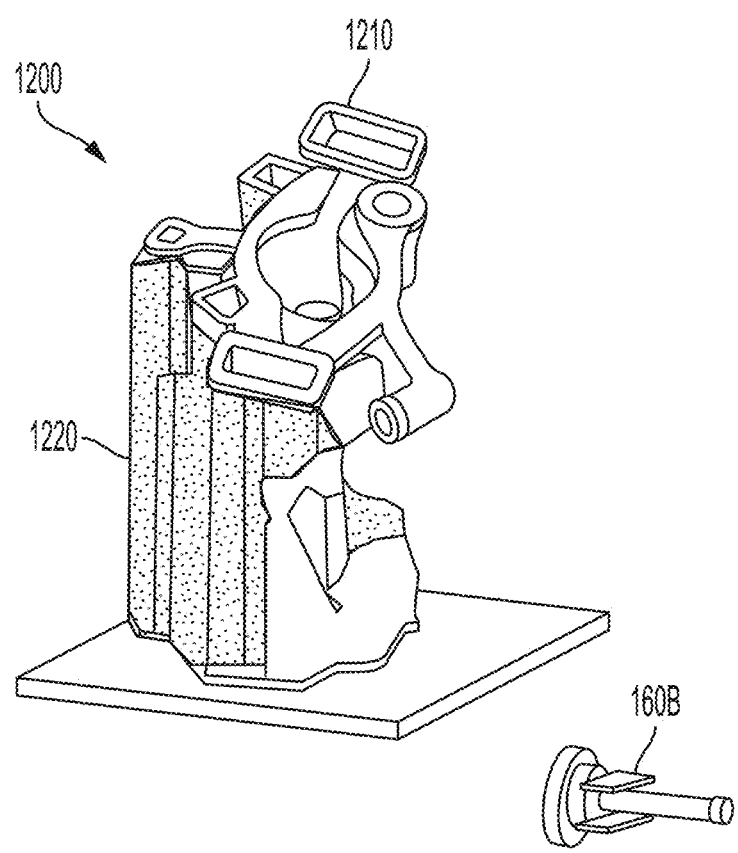
Figure 14D:
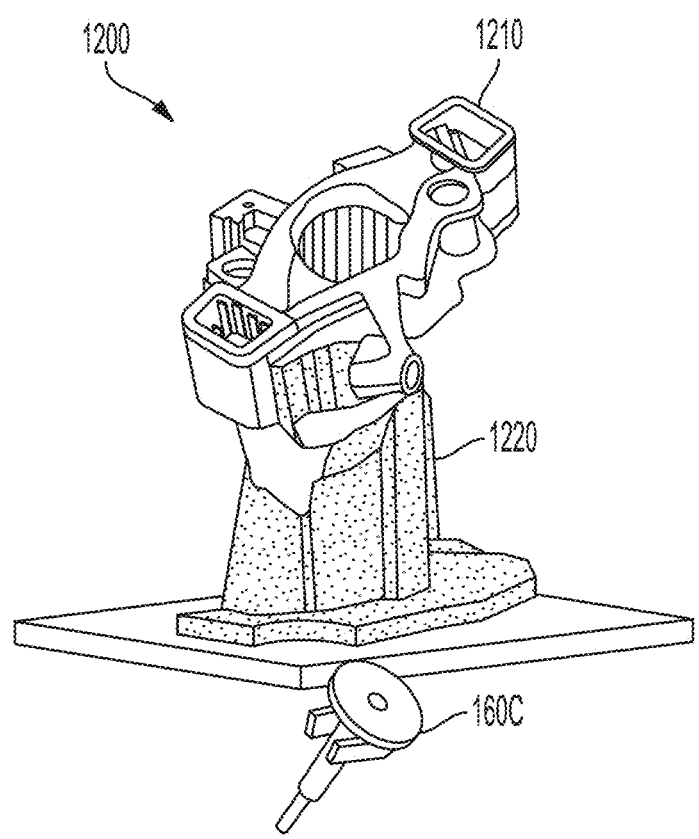
Figure 14E:
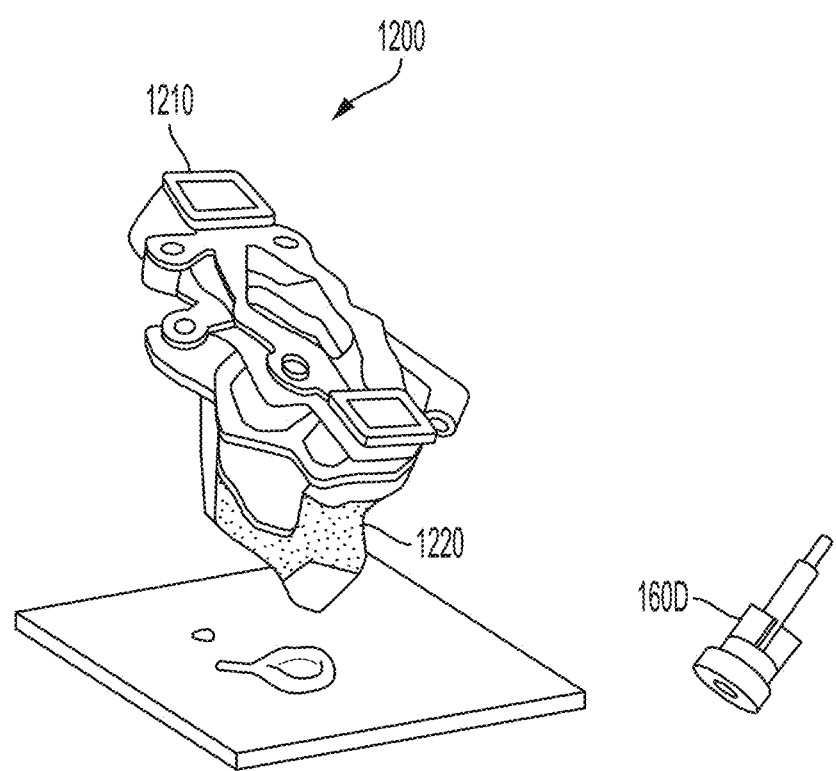

FIGS. 14A-14E depict progressive removal of the support volume 1220 from the NSS 1200 to yield the 3D part 1210, according to an embodiment. In this particular example, the structure removal plan has/uses $\tau_{acc}$=0.025 and $\tau_{rem}$=0.1. In FIG. 14A, the first subtractive tool assembly 160A has removed 19.78% of the support volume 1220. In FIG. 14B, the first subtractive tool assembly 160A has removed an additional 31.59% of the support volume 1220. In FIG. 14C, the second subtractive tool assembly 160B has removed an additional 29.57% of the support volume 1220. In FIG. 14D, the third subtractive tool assembly 160C has removed an additional 13.52% of the support volume 1220. In FIG. 14E, a fourth subtractive tool assembly 160D has removed another 2.24% of the support volume 1220. As a result, the 3D part 1210 remains. Other heuristics or quantities of interest such as the time or cost of each subtractive tool assembly 160A-160D, reorientation, or different physics can also be added to the proposed framework to construct more informed manufacturing plans. Further, motion planning tools such as an OMPL can be used to increase the accuracy of generated plans.

Figure 15:
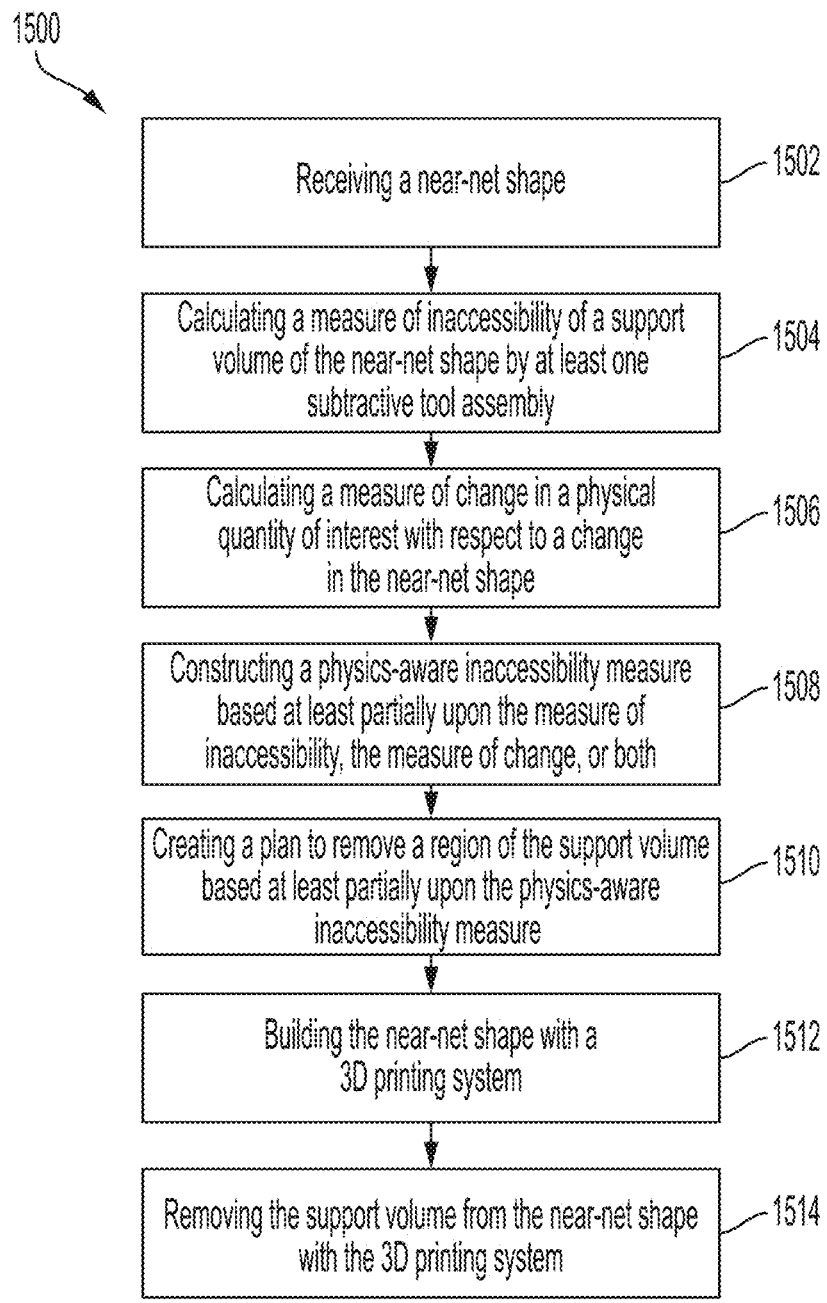
FIG. 15 depicts a flowchart of a method for planning for removal of the support volume from the NSS, according to an embodiment.

FIG. 15 depicts a flowchart of a method 1500 for planning for removal of the support volume 1220 in hybrid manufacturing, according to an embodiment. An illustrative order of the method 1500 is provided below; however, one or more steps of the method 1500 may be performed in a different order, combined, split into sub-steps, repeated, or omitted without departing from the scope of the disclosure. One or more steps of the method 1000 may be performed using the computing system 190.

The method 1500 may include receiving the near-net shape 1200, as at 1502. The representation may be received by (and/or provided to) the computing system 190. The representation may also or instead include the 3D part 1210 and/or the support volume 1220. The representation may also or instead include the subtractive tool assembly 160.

The method 1500 may also include calculating a measure of inaccessibility of the support volume 1220 by the at least one subtractive tool assembly 160, as at 1504. The measure of inaccessibility may be calculated using the computing system 190. The measure of inaccessibility is defined above.

The method 1500 may also include calculating a measure of change in a physical quantity of interest with respect to a change in the near-net shape, as at 1506. The measure of change may be calculated by the computing system 190. The physical quantity of interest may be or include deformation, strain energy, stress, strain, buckling, thermal conduction, thermal convection, etc. The change may be or include a hypothetical change. The change may be smaller than a predetermined size. For example, the change may be infinitesimal.

The method 1500 may also include constructing a physics-aware inaccessibility measure based at least partially upon the measure of inaccessibility, the measure of change, or both, as at 1508. The physics-aware inaccessibility measure may be constructed using the computing system 190. The physics-aware inaccessibility measure may be constructed by combining the measure of inaccessibility and the measure of change. The physics-aware inaccessibility measure indicates a removability (i.e., an ability to remove) of a region of the support volume 1220 from the near-net shape 1200.

The method 1500 may also include creating a plan to remove a region of the support volume 1220 based at least partially upon the physics-aware inaccessibility measure, as at 1510. The plan may be created using the computing system 190. More particularly, this step may include creating a plan to remove the region of the support volume 1220 with the at least one subtractive tool assembly 160.

The method 1500 may also include building the near-net shape 1200 with the 3D printing system 100, as at 1512. The near-net shape 1200 may be built based at least partially upon the plan.

The method 1500 may also include removing the support volume 1220 from the near-net shape 1200 with the 3D printing system 100, as at 1514. More particularly, this may include removing the accessible support volume 1220 from the near-net shape 1200 using the subtractive tool assembly 160. This may yield the 3D part 1210.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method, comprising:
   receiving a representation of a near-net shape comprising a 3D part and a support volume;
   calculating a measure of inaccessibility of the support volume by at least one subtractive tool assembly; calculating a measure of change in a physical quantity of interest with respect to a change in the near-net shape;
   constructing a physics-aware inaccessibility measure based at least partially upon a sum of the measure of inaccessibility and the measure of change;

creating a plan to remove at least a portion of the support volume using the at least one subtractive tool assembly based at least partially upon the physics-aware inaccessibility measures building the near-net shape using a 3D printer; and removing a region of the support volume from the near-net shape using the at least one subtractive tool assembly based at least partially upon the plan to yield the 3D part.

2. The method of claim 1, wherein the at least one subtractive tool assembly comprises a multi-axis machining tool.

3. The method of claim 2, wherein the multi-axis machining tool comprises a 2-axis turning machine, a 3-axis milling machine, a 5-axis turn-milling machine, a sawing machine, a wire-cutting machine, a laser-cutting machine, or a combination thereof.

4. The method of claim 1, wherein the measure of inaccessibility comprises a continuous, spatial field that quantifies to what extent different points in the initial design domain cannot be accessed by the at least one subtractive tool assembly.

5. The method of claim 4, wherein the at least one subtractive tool assembly comprises a plurality of subtractive tool assemblies, and wherein the measure of inaccessibility is calculated for the plurality of subtractive tool assemblies as a minimum of the measure of inaccessibility for each of the plurality of subtractive tool assemblies.

6. The method of claim 5, wherein the measure of inaccessibility for each of the plurality of subtractive tool assemblies at every query point of the initial design domain is calculated as a minimum of the measure of inaccessibility for different configurations at which the query point is removable by the plurality of subtractive tool assemblies.

7. The method of claim 6, wherein the different configurations comprise:
at least one displacement that brings the at least one subtractive tool assembly in contact with the query points; and
one or more orientations that are available to the at least one subtractive tool assembly.

8. The method of claim 1, wherein the measure of inaccessibility is at least partially defined by a volume of a collision between the at least one subtractive tool assembly and the 3D part.

9. The method of claim 1, further comprising receiving a representation of at least one fixture for subtractive manufacturing and a build platform, and wherein the measure of inaccessibility is at least partially defined by a volume of a collision between the at least one subtractive tool assembly and the near-net shape, the build platform, the at least one fixturing device, or a combination thereof.

10. The method of claim 1, wherein the measure of change in the physical quantity of interest is based at least partially upon a topological sensitivity field.

11. The method of claim 10, wherein the topological sensitivity field is with respect to deformation or stress caused by a weight of the near-net shape.

12. The method of claim 10, wherein the topological sensitivity field is with respect to deformation or stress caused by a contact force of the at least one subtractive tool assembly.

13. The method of claim 1, wherein the physics-aware inaccessibility measure comprises a weighted sum of the measure of inaccessibility and the measure of change.

14. A method of planning for removal of a support volume in hybrid manufacturing, the method comprising:
providing a computer with a representation of:
a 3D part;
a near-net shape comprising the 3D part and the support volume; and
at least one subtractive tool assembly with a number of degrees of freedom;
calculating a measure of inaccessibility of the support volume by the at least one subtractive tool assembly using the computer;
calculating a measure of change in a physical quantity of interest with respect to a change in the near-net shape using the computer;
constructing a physics-aware inaccessibility measure by summing the measure of inaccessibility and the measure of change using the computer, wherein the physics-aware inaccessibility measure indicates a removability of a region of the support volume from the near-net shape;
creating a plan to remove the region of the support volume with the at least one subtractive tool assembly using the computer, wherein the plan is based at least partially upon the physics-aware inaccessibility measure;
building the near-net shape using a 3D printer; and
removing the region of the support volume from the near-net shape based at least partially upon the plan to yield the 3D part.

15. The method of claim 14, wherein the change comprises a hypothetical change that is less than a predetermined size.

16. The method of claim 14, wherein the physical quantity of interest comprises stress.

17. A method of planning for removal of a support volume in hybrid manufacturing where the support volume is added during an additive manufacturing process and subsequently removed through a subtractive manufacturing process, the method comprising:
providing a computer with a representation of:
a 3D part;
a near-net shape comprising the 3D part and the support volume; and
at least one subtractive tool assembly with a number of degrees of freedom;
calculating a measure of inaccessibility of the support volume by the at least one subtractive tool assembly using the computer;
calculating a measure of change in a physical quantity of interest with respect to a hypothetical change in the near-net shape, wherein the hypothetical change is less than a predetermined size;
constructing a physics-aware inaccessibility measure by summing the measure of inaccessibility and the measure of change using the computer, wherein the physics-aware inaccessibility measure indicates a removability of a region of the support volume from the near-net shape;
creating a plan to remove the region of the support volume with the at least one subtractive tool assembly using the computer, wherein the plan is based at least partially upon the physics-aware inaccessibility measure;
building the near-net shape via the additive manufacturing process using a 3D printer; and
removing the region of the support volume from the near-net shape via the subtractive manufacturing process based at least partially upon the plan to yield the 3D part.

18. The method of claim 17, wherein the hypothetical change comprises a change that is less than a predetermined threshold.

\* \* \* \* \*

UNITED STATES PATENT AND TRADEMARK OFFICE
CERTIFICATE OF CORRECTION

PATENT NO. : 11,656,602 B2
APPLICATION NO. : 17/445639
DATED : May 23, 2023
INVENTOR(S) : Amirmassoud Mirzendehdel, Morad Behandish and Saigopal Nelaturi It is certified that error appears in the above-identified patent and that said Letters Patent is hereby corrected as shown below:

In the Specification

At Column 1, immediately after the title, please insert the following heading and paragraph:
--Government Support
This invention was made with U.S. Government support under Contract No. HR0011-17-2-0030 [G011.3809] awarded by DARPA-TRADES-FIELDS. The U.S. Government has certain rights in the invention.--

Signed and Sealed this
First Day of August, 2023

Katherine Kelly Vidal
*Director of the United States Patent and Trademark Office*